(12) United States Patent
Glenn et al.

(10) Patent No.: US 10,534,011 B2
(45) Date of Patent: *Jan. 14, 2020

(54) BIDIRECTIONAL FLOW SWITCH

(71) Applicant: Gems Sensors Inc., Plainville, CT (US)

(72) Inventors: Brian J. Glenn, Burlington, CT (US); Nathan H. Kulak, Farmington, CT (US)

(73) Assignee: Gems Sensors Inc., Plainville, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,081

(22) Filed: Mar. 30, 2017

(65) Prior Publication Data

US 2017/0284842 A1    Oct. 5, 2017

Related U.S. Application Data

(60) Provisional application No. 62/315,054, filed on Mar. 30, 2016.

(51) Int. Cl.
*G01F 1/56* (2006.01)
*G01P 13/00* (2006.01)

(52) U.S. Cl.
CPC .................................. *G01P 13/00* (2013.01)

(58) Field of Classification Search
None
See application file for complete search history.

(56) References Cited

U.S. PATENT DOCUMENTS

| | | | |
|---|---|---|---|
| 4,996,396 A | | 2/1991 | Smith |
| 5,070,220 A | * | 12/1991 | Glenn .................. F16L 55/10 |
| | | | 200/81.9 M |
| 5,416,294 A | * | 5/1995 | Glenn .................. H01H 35/405 |
| | | | 200/81.9 M |
| 5,621,398 A | * | 4/1997 | Blair ...................... G01D 3/022 |
| | | | 340/686.1 |
| 6,472,624 B1 | | 10/2002 | Harris et al. |
| D606,165 S | | 12/2009 | Kurisaki |
| 8,264,361 B2 | | 9/2012 | Struyk |

(Continued)

FOREIGN PATENT DOCUMENTS

| | | |
|---|---|---|
| AU | 2015261923 | 12/2015 |
| JP | 5663480 | 2/2015 |
| WO | WO2010031162 | 3/2010 |

OTHER PUBLICATIONS

Office Action dated Oct. 5, 2018, for co-pending U.S. Appl. No. 15/475,090.

(Continued)

*Primary Examiner* — Natalie Huls
*Assistant Examiner* — Mohammed E Keramet-Amircolai
(74) *Attorney, Agent, or Firm* — Nelson Mullins Riley & Scarborough LLP

(57) ABSTRACT

A bidirectional flow switch includes a housing having a flow passage therethrough. A body is disposed movably in the flow passage and biased towards a first position at zero flow. A magnetic sensor is disposed proximate the housing. A magnet is disposed with respect to the body and the magnetic sensor so that when the body is at the first position, the magnetic sensor is at a first state and so that the magnetic sensor is at a second state when a flow rate through the flow passage is greater than a threshold flow rate that moves the body from the first position.

16 Claims, 7 Drawing Sheets

(56) References Cited

U.S. PATENT DOCUMENTS

| | | |
|---|---|---|
| 8,882,054 B1 | 11/2014 | Maki et al. |
| 8,978,750 B2 | 3/2015 | Noske et al. |
| 2002/0020460 A1 | 2/2002 | Viken |
| 2006/0141912 A1 | 6/2006 | Valentini |
| 2007/0083921 A1 | 4/2007 | Parris et al. |
| 2008/0094107 A1* | 4/2008 | Dallaire .............. H03K 5/2481 |
| | | 327/63 |
| 2010/0253019 A1 | 10/2010 | Ogawa |
| 2015/0204701 A1 | 7/2015 | Klicpera |
| 2015/0211332 A1 | 7/2015 | Noske et al. |
| 2016/0076909 A1 | 3/2016 | Klicpera |
| 2017/0284843 A1 | 10/2017 | Glenn et al. |

OTHER PUBLICATIONS

Prototype Photo 1.
Prototype Photo 2.

* cited by examiner

BIDIRECTIONAL FLOW SWITCH

CROSS REFERENCE TO RELATED APPLICATION

The present application claims priority to U.S. provisional patent application Ser. No. 62/315,054, filed Mar. 30, 2016, entitled SYSTEM AND METHOD FOR IMPROVED BI-DIRECTIONAL FLOW SWITCH, the entire disclosure of which is hereby incorporated by reference herein.

FIELD OF THE INVENTION

Example embodiments generally relate to switches and, in particular, to flow switches for detecting bidirectional fluid flow.

BACKGROUND OF THE INVENTION

Equipment manufacturers engaged in the production of flow switches for fluid or gas sensing have various technologies available to them in the design of sensing elements to accommodate a variety of flow rate sensing hardware. Most manufacturers seeking a simple solution to threshold sensing specify sensors to communicate that flow has risen above, or fallen below, a specific set point in an application. Typically, for these types of applications, the need is for a switch that is capable of sensing flow in only one direction. Routinely, the need is served well by simple switch designs available in a variety of sizes and configurations.

When there is a need to sense flow in both forward and reverse directions in a process, sensor choices become more limited, and manufacturers may opt to serve the need by choosing a more complicated, continuous sensing device. Many of these types of sensors have the ability of sensing bidirectional flow by employing the use of electronic circuitry that is capable of processing signals from mechanical or electronic components in the flow stream. Unfortunately, although these technologies may be effective, they are typically more expensive due to their complex nature. In addition, they can be more susceptible to the effects of unintended external electrical interference than the simpler, electronic solutions typically found in a one directional flow switch.

In certain bidirectional flow switches, sometimes referred to as paddle switches, a generally planar paddle extends into a flow path, where the plane of the paddle is oriented perpendicularly to the flow path's general flow direction under zero flow conditions. The planar paddle is hinged at an end so that flow through the flow path impinges upon the paddle and causes it to pivot about the hinge's axis. As the paddle pivots about the hinge from its perpendicular, zero-flow position, a mechanical linkage from the paddle pulls a magnet, which is spring biased away from a reed switch, towards the reed switch. A threshold flow causes the magnet to travel to a position proximate the reed switch so that the reed switch changes from an open state to a closed state. Alternatively, continuous sensing devices, such as, for example, paddle wheel meters or ultrasonic meters, may be more complex and expensive than simple one-direction flow switches. In a paddle wheel switch, a cylindrical wheel has flanges and magnets disposed in a spaced apart manner about its cylindrical outer surface. A portion of this surface extends into the flow path so that fluid flow engages the paddles and correspondingly turns the wheel. The remaining portion of the wheel extends outside the flow path, at which magnetically-sensitive electronics detect movement of the rotating magnets. Such arrangements can be susceptible to damage in response to high flow rates and can require relatively sophisticated circuitry to respond to frequency of magnet movement.

SUMMARY OF THE INVENTION

The present invention recognizes and addresses considerations of prior art constructions and methods.

In an embodiment, a bidirectional flow switch has a housing that defines a first port, a second port, and a flow passage between the first port and the second port so that the flow passage defines a first flow direction from the first port to the second port and a second flow direction from the second port to the first port. Two magnetic sensors are disposed proximate the housing in a position fixed with respect to the first flow direction and the second flow direction. A body is disposed movably within the flow passage. An elastic member is disposed between the housing and the body so that the elastic member biases the body to a first position when no fluid flows through the passage. A magnet is attached to the body so that the magnet is movable with the body in the passage in the first flow direction and in the second flow direction, in response to flow of fluid in the passage in the first flow direction and flow of fluid in the passage in the second flow direction, respectively. The magnet is disposed with respect to the body, and the body and the magnetic sensors are disposed with respect to the flow passage, so that at the first position of the body, the magnet and the magnetic sensors are disposed with respect to each other so that the magnetic sensors are in a first state, and upon a predetermined rate of flow of fluid in the first flow direction, the body moves within the passage from the first position so that the magnet moves in the first flow direction, causing relative movement between the magnet and the magnetic sensors that causes the magnetic sensors to change state from the first state, and, upon a predetermined rate of flow of fluid in the second flow direction, the body moves within the passage from the first position so that the magnet moves in the second flow direction, causing relative movement between the magnet and the magnetic sensors that causes the magnetic sensors to change state from the first state.

In a further embodiment, a bidirectional flow switch has a housing defining a flow passage that is elongated in a first direction, two magnetic sensors, each in a respective fixed position with respect to the flow passage, and a body that is disposed in the flow passage and that is movable with respect to the housing. A magnet is in a fixed position with respect to the body so that a movement of the body causes a movement of the magnet, wherein the movement of the magnet has a directional component in the first direction. An elastic member biases the body towards a first position within the flow passage. The body and the housing are configured so that a first threshold flow rate through the flow body in the first direction causes the magnet to move past a first displacement distance in the first direction, and a second threshold flow rate through the body in a second direction that is opposite the first direction causes the magnet to move past a second displacement distance in the second direction. The magnetic sensors are in a first state when the body is in the first position, and the magnetic sensors are in a second state that is different from the first state when the body is displaced past at least one of the first displacement distance in the first direction and the second displacement direction in the second direction.

In a still further embodiment, a bidirectional flow switch has a housing defining a generally cylindrical flow passage between a first port and a second port so that the flow passage defines a first flow direction from the first port to the second port and a second flow direction from the second port to the first port. A body is movable with respect to the housing in the first flow direction and in the second flow direction, wherein the body includes a solid portion across its interior so that fluid received by a respective end of the body from the first port or the second port flows about the solid portion and between an outer surface of the solid portion and an inner surface of the flow passage. A stepped down section within the cylindrical flow passage has a diameter smaller than the flow passage on both sides of the stepped down section. Two magnetic sensors are attached to the housing. A magnet is attached to the body. A pair of springs bias the body towards a first position in which the magnet is aligned with the magnetic sensor and the stepped down section in a direction transverse with the first direction. When the body is in the first position, a distance is defined between the stepped down section and an exterior of the body so that a first threshold flow rate through the housing in the first direction causes the magnet to move past a first displacement distance in the first direction, and a second threshold flow rate through the housing in the second direction causes the magnet to move past a second displacement distance in the second direction. The magnetic sensors are in a first state when the body is in the first position. The magnetic sensor is in a second state that is different from the first state when the body is displaced past at least one of the first displacement distance in the first direction and the second displacement direction in the second direction.

Further areas of applicability of the present invention will become apparent from the detailed description provided hereinafter. It should be understood that the detailed description and specific examples, while indicating one or more embodiments of the invention, are intended for purposes of illustration only and are not intended to limit the scope of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
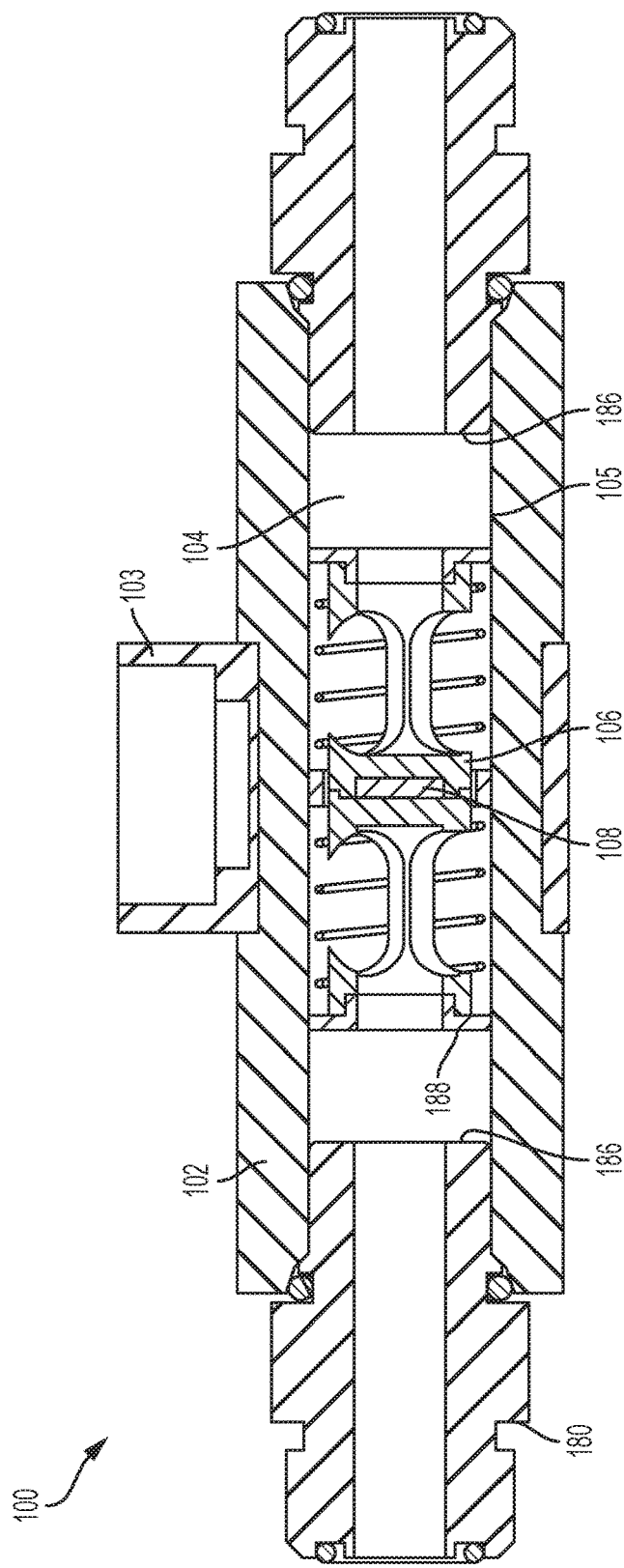
FIG. 1 is a cross-sectional view of a bidirectional flow switch according to an example embodiment.

Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all, example embodiments are shown. Indeed, the examples described and pictured herein should not be construed as being limiting as to the scope, applicability, or configuration of the present disclosure. Like reference numerals refer to like elements throughout. As used herein, "operable coupling" should be understood to refer to direct or indirect connection that, in either case, enables functional interconnection of components that are operably coupled to each other.

As used herein, terms referring to a direction or a position relative to the orientation of a bidirectional flow switch, such as but not limited to "vertical," "horizontal," "above," or "below," refer to directions and relative positions with respect to the flow switch's orientation in its normal intended operation, as indicated in FIG. 1.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

A bi-directional switch according to one or more embodiments as described herein includes a flow body that houses a piston that is translated by fluid flow within a stepped metering bore in the flow body. The piston is designed to respond equally to fluid flow in either direction and to minimize the development of pressure drop as process flows ramp to higher rates above a sensed set-point. In a particular configuration, the sensor provides a primary output at a "no-flow" condition and a secondary output when flow has moved above a prescribed set point, regardless of flow direction. In order to provide an output, the piston holds a permanent magnet, allowing it to communicate with a magnetically operated reed switch housed outside the flow stream in the flow body. Although sensor output via a magnetically actuated reed switch is desirable, it should be understood that alternative magnetically actuated electronic components, such as a Hall Effect sensor, inductive sensor, or suitable device, may also be used.

An advantage of the improved system and method according to such embodiments is that the design is flexible enough to provide for variety of circuit conditions, depending on a specific application's needs. The sensor is configured in a normally closed condition for use in applications where knowledge of the actual direction of flow may not be essential, but rather, only that flow above a certain threshold is present in either direction. In this case flow, rising above the calibrated set point in either direction allows the switch to open and indicate that flow is present. In alternate configurations, the piston is translated to trip multiple reed switches, to not only indicate that fluid flow has been achieved, but to also indicate the particular direction that fluid is moving in the process.

It should be understood that the geometry facilitates machining of components from metal materials of construction, which may be valuable in meeting the needs of higher pressure applications such as hydraulic systems, for example. However, the need for lower cost variants in lower pressure OEM type applications may be better severed in some instances with a machined or molded plastic version of the device, and the components lend themselves to such methods of fabrication. In certain embodiments of a forged or cast metal housing, or of a plastic molded flow body, the sub-housing that receives the reed switch assembly may be provided as an integral part of the flow body itself, eliminating the need for the added sub-housing shown in the Figures and described herein to house the reed switch.

Referring to FIG. 1, it can be seen that a piston is constructed with a center section comprised of an outside diameter that is designed with an internal cavity to receive a permanent magnet. The outside diameter at this center region of the piston acts as a metering region and is associated with a stepped down, metering bore in the center of the flow body. It should be noted that while this center metering region on the piston is shown as a diameter which is continuous, with the diameters containing the axially slotted bypass geometry on either side of it, it may be produced with a different diameter, as necessary, to produce an appropriate flow restriction, and thus the set point required in a particular application. It therefore follows that the dimensional relationship between these two cylindrical elements, i.e. the stepped down area in the flow body and the center diameter of the piston that opposes that stepped down area, is calibrated, as required, to accommodate various switch set points as desired.

Figure 4:
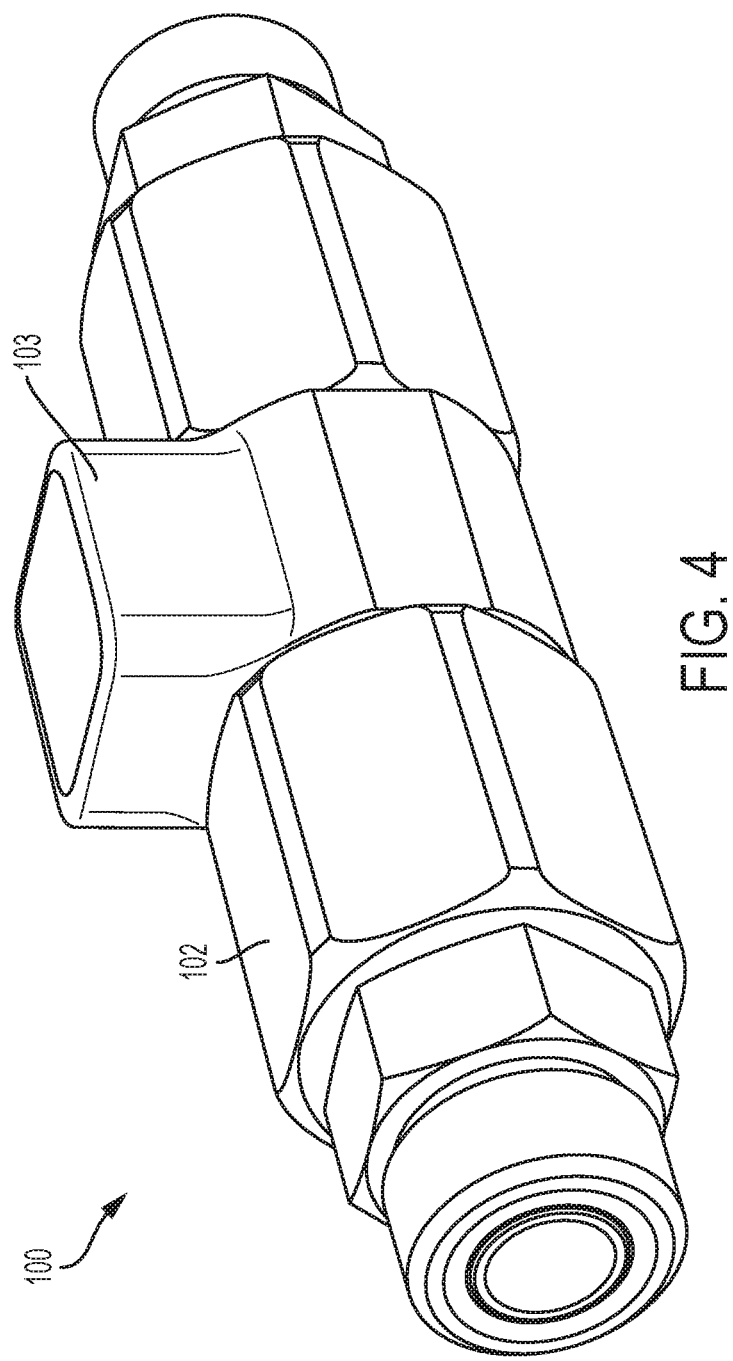
FIG. 4 is a perspective view of the bidirectional flow switch of FIG. 1.

FIG. 1 illustrates a cross-sectional view of a bidirectional flow switch 100 according to an example embodiment. Referring also to FIG. 4, the flow switch includes an elongated main body or housing 102 having a generally hexagonal exterior cross section perpendicular to its direction of elongation. Main body 102 further defines a generally cylindrical through-bore that defines a flow passage 104 bounded by inner surface 105 of main body 102 and that extends in the housing's direction of elongation. In an embodiment, main body 102 is comprised of brass. In further embodiments, the main body may be comprised of other suitable materials, such as, for example, polymer, steel, stainless steel or aluminum. A normally open reed switch (not shown) is held in a reed switch sub-housing 103. Reed switch housing 103 includes a female coupling for receiving a male coupling (not shown) that has a first and a second electrical wire (not shown) that electrically connect through the reed switch so that when the reed switch is open, current cannot pass through electrical wires and, when the switch is closed, current may pass through the electrical wires. The male and female couplings mate with each other so that, when coupled, a first electrical lead of the reed switch is operably coupled to the first electrical wire, and a second electrical lead of the reed switch is operably coupled to the second electrical wire. In this way, when the reed switch closes, the first and second electrical leads are in electrical communication, so the first and second wires are similarly in electrical communication. The reed switch is in a fixed position with respect to main body 102 in both the axial and radial directions with respect to the axis of flow passage 104. Reed switch housing 103 is comprised of molded polymer and is secured proximate main body 102, and, in particular, embodiments may be attached to the exterior surface of or may extend into body 102. In the illustrated embodiments, reed switch housing 103 fits within a recessed axial groove in main body 102 and is held in place with epoxy.

Disposed within flow passage 104 is a brass, polymer, aluminum (or other suitable material) piston 106 housing one or more rare earth neodymium disc magnets 108 with a north-south polarity aligned with the elongation or flow direction of passage 104.

Figure 2:
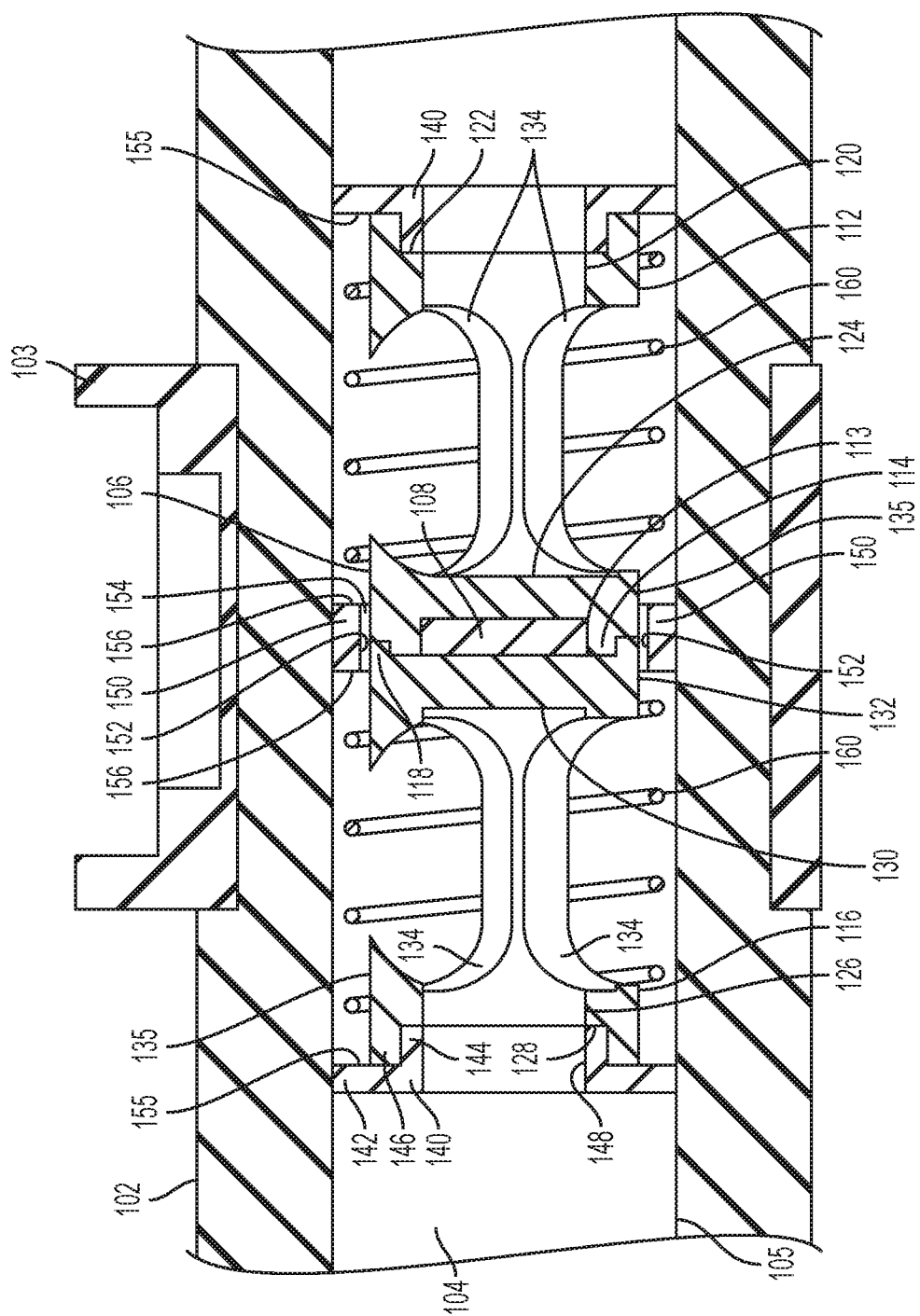
FIG. 2 is a partial cross-sectional view of the bidirectional flow switch of FIG. 1.

Turning now to FIG. 2, the piston is shown outfitted with flanges on each end that are assembled to lock a set of opposing compression springs to the stepped down area at the center of the flow body. This assembled relationship causes the center of the piston to bias to the center of the flow body and align the permanent magnet to the center housed reed switch at a no-flow condition. The flanged ends of the piston further act as guides to allow concentric travel of the piston within the flow body bypass bores. These flanged components can be adjusted via various means to create a dimensional equilibrium between the opposing springs as necessary. The upstream and downstream ends of the piston are characterized by slots placed at angular intervals around the axis of the piston, which communicate with a pair of blind bores on opposite ends of the piston. These slots and bores act as bypass features for fluid passage under flow conditions.

Figure 5:
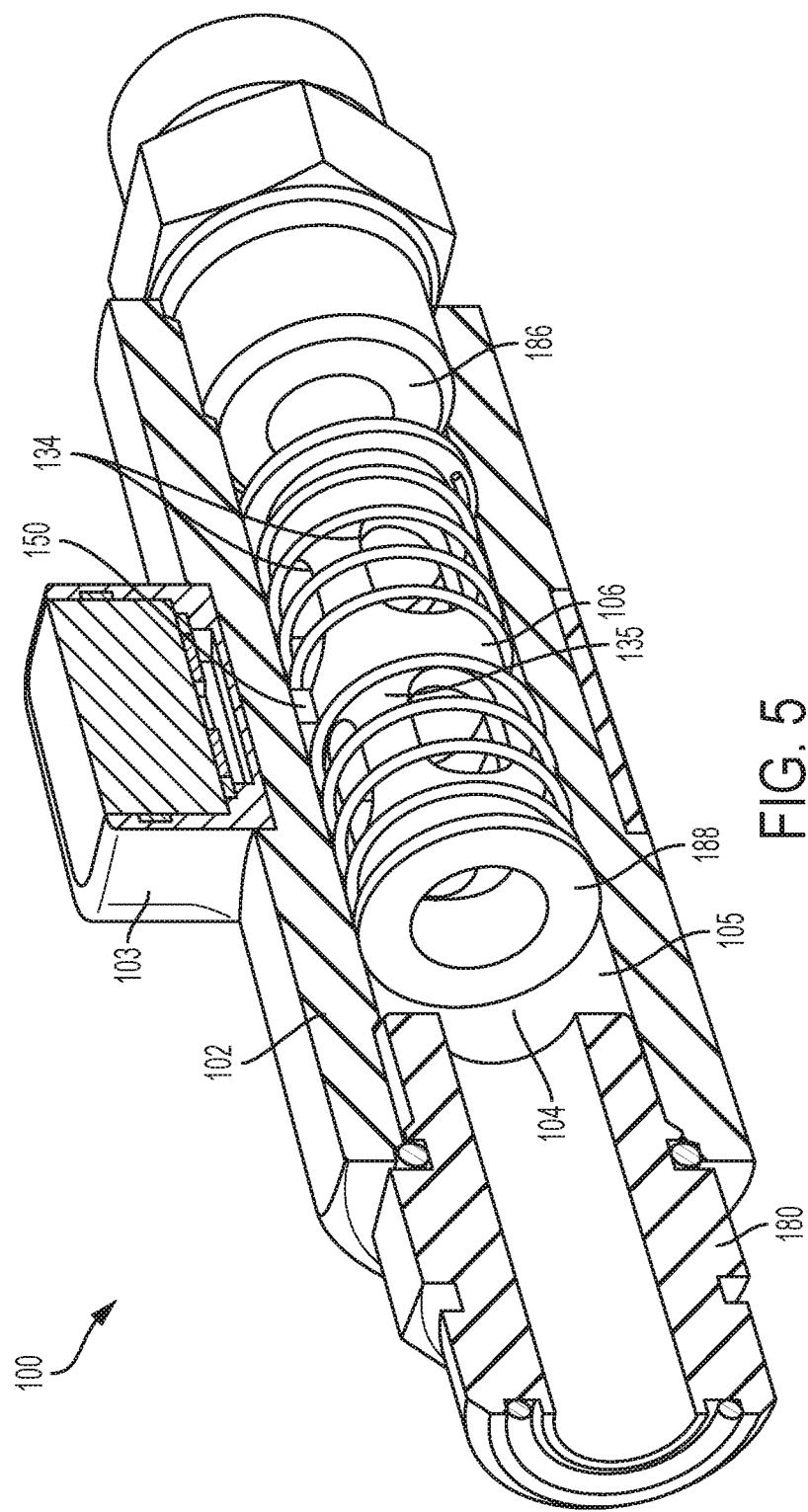
FIG. 5 is a perspective view of a cross section of the bidirectional flow switch of FIG. 1.

More specifically, and referring to FIG. 2 and also FIG. 5, piston 106 has a generally cylindrical outer profile with flanged ends and a plurality of slots extending radially inward from an outer radial surface to blind bores extending axially from each end. Piston 106 comprises a generally cylindrical first section 112 having a cylindrical male protrusion 114, coaxially aligned with first section 112, extending from one end. First section 112 has a cylindrical recessed portion 113 therein to receive magnet 108. In the illustrated embodiment, recessed portion 113 has a depth equal to or slightly larger than magnet 108's thickness (in the axial direction of flow passage 104 and of the magnet) so that magnet 108 substantially fills recessed portion 113. First section 112 mates with a generally cylindrical second section 116 via male protrusion 114 extending into a female cylindrical receptacle 118 within second section 116. First section 112 and second section 116 attach via, for example, threaded coupling (i.e. male threads on male protrusion 114 mate with female threads in female receptacle 118) or press-fit, and an adhesive may further be used to secure the first and second sections. Magnet 108 is received within recessed portion 113 prior to coupling first portion 112 and second portion 116. In this way, magnet 108 is received and held in a fixed position in piston 106 so that movement of piston 116 corresponds with respective movement of magnet 108. That is, when piston 116 translates in the axial direction of flow through flow passage 104, magnet 108 translates accordingly. Moreover, the center of recessed portion 113 is centered in piston 106. For example, in embodiments in which the piston is generally cylindrical, and where the magnet is disk-shaped, the magnet and body 102 are disposed coaxially with respect to each other. In this way, when piston 106 is centered within flow switch 100 (e.g. when a generally cylindrical body 102 is arranged generally coaxially within a generally cylindrical flow passage 104), magnet 108 is also coaxial with the flow passage.

A first blind bore 120 extends into first section 112 from a first outer face 122 to a first stop face 124. Similarly, a second blind bore 126 extends into second section 116 from a second outer face 128 to a second stop face 130. Between first stop face 122 and second stop face 130 is a solid section 132 through which fluid cannot pass and, therefore, has to circumvent. Slots 134 extend radially through piston 106 from an outer radial surface 135 to first and second blind bores 120, 126 and provide openings through which fluid circumvents solid section 132, as is discussed in further detail below. In the illustrated embodiment, the slots have the geometry created by an end mill plunged radially inward through the piston and then moved axially to create an elongated profile. However, slots 134 are not necessarily limited to such geometry and may therefore have various other geometries that serve a similar purpose of providing fluid communication between outer radial surface 135 and first blind bore 120 and between outer radial surface 135 and second blind bore 126 in order to circumvent solid section 132.

First section 112 and second section 116 each attaches to a respective piston flange 140 at opposing ends of piston 106. Each piston flange 140 comprises an annular, radially extending flange portion 142 and an axially protruding end 144 that extends into one of female ends 146 in first section 112 and second section 116. In the illustrated embodiment, female ends 146 are embodied as respective cylindrical, counterbored recessions within first section 112 and second section 116. Female ends 146 may further include threads defined on the inner diameter of the inner bore that mate with male threads on the outer diameter of protruding ends 144 of piston flanges 140. It should be understood, however, that other means for attaching components 144 and 146 may be used, for example interference fit or via a suitable adhesive, e.g. epoxy. An axial through-bore 148 defined by the inner diameter of each of flanges 140 provides fluid communication between flow passage 104 and blind bores 120, 126. Piston flanges 140 orient piston 106 within flow passage 104 in that the radially outer surfaces of flange portions 142 are slidably received within inner surface 105 with about a 0.010 to 0.020 inch tolerance between the radially outer surfaces of flange portions 142 and the interior surface 105. Piston flanges 140 also provide faces against which spring bias may be applied, as discussed below.

Figure 6:
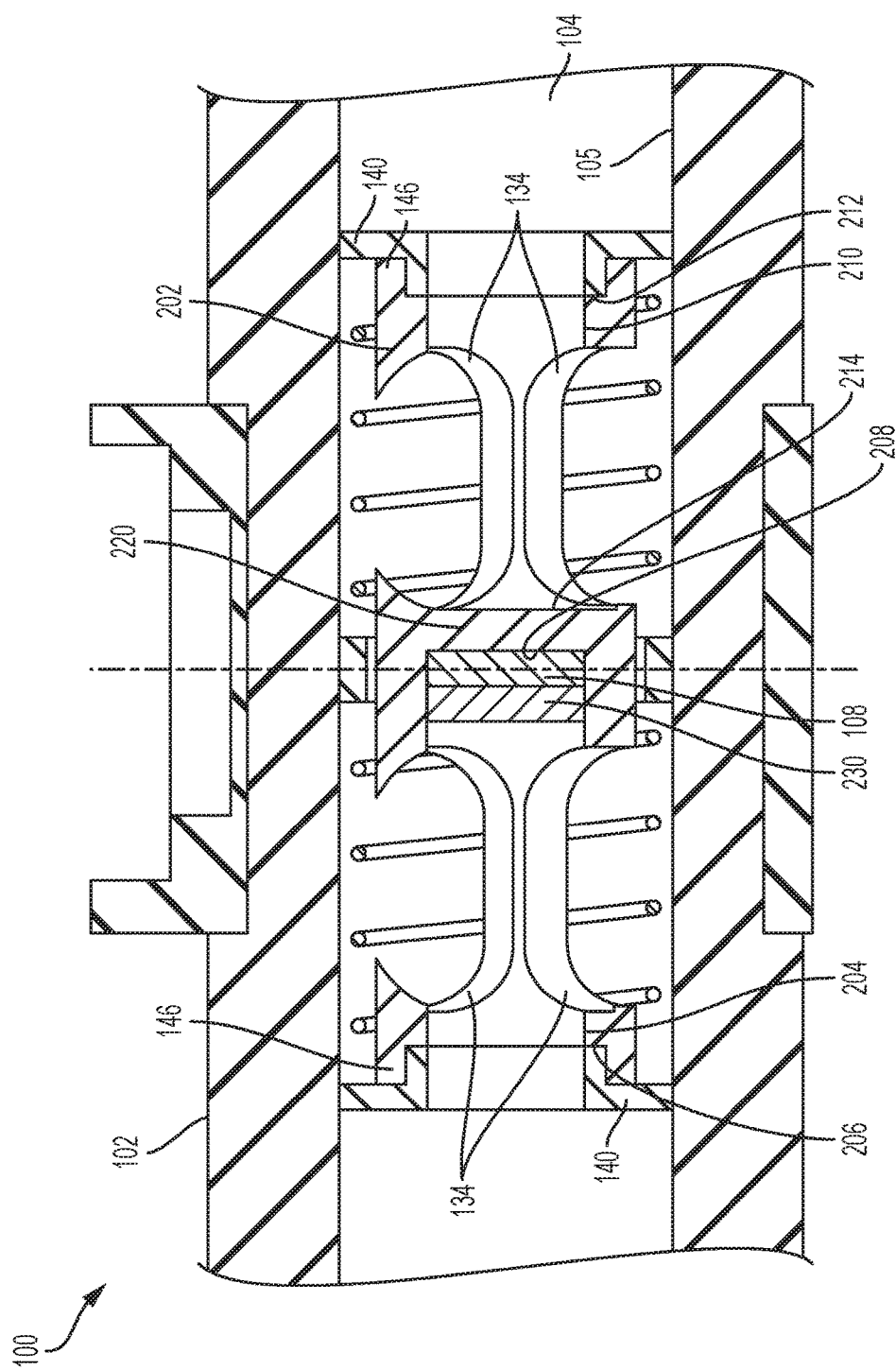
FIG. 6 is a cross-sectional view of the bidirectional flow switch of FIG. 1 with an alternative piston assembly.

FIG. 6 illustrates an alternate embodiment of piston 106, in which a unitary body section 202 is used instead of the two discrete sections 112 and 116 of FIGS. 1-5. Body section 202 has a generally cylindrical outer surface and defines a first generally cylindrical blind bore 204 extending from a first countersunk end face 206 to a first stop face 208 and a second generally cylindrical blind bore 210 extending from a second countersunk end face 212 to a second stop face 214, thereby leaving a solid section 220 extending transversely to the piston's elongation axis through which fluid cannot pass. Body section 202 comprises female receptacles 146 at each end, as described above, for receiving protruding ends 144 of flanges 140, thereby attaching body section 202 to piston flanges 140. Slots 134, similar to those described above, extend radially outward from blind bores 204, 208 to and through exterior surface 226. Magnet 108 is inserted into first cylindrical bore 204 to abut first stop face 208 and may be held in place via an adhesive, such as an epoxy. Alternatively, or in conjunction with the adhesive, a brass plug 230 is press-fit into first cylindrical bore 204 against a first face of magnet 108 opposite a second face of magnet 108 that abuts stop face 208, thereby locking magnet 108 in place within cylindrical bore 204.

Referring again to FIG. 2, main body 102 comprises a stepped-down portion 150 that depends radially inward from the main portion of body inner surface 105 and that is embodied as an annulus having a central through-bore that is coaxial with flow passage 104. Annulus 150 may be a unitary extension of main body 102 manufactured, for example, by machining of the main body. In further embodiments, annulus 150 is fixed in place within flow passage 104 at inner surface 105 with an adhesive, such as epoxy.

The reed switch (or each reed switch, in embodiments housing multiple reed switches) includes a first contact and a second contact that are aligned parallel to the elongation of main body 102, and the first and second contacts overlap but are physically separated when no magnetic field, or an insufficient magnetic field, is present at a middle of the reed switch. When magnet 108 is disposed in flow passage 104 so that the magnet's north and south poles are aligned in the elongation direction of flow path 104 and with the magnet aligned with the middle of the reed switch in a direction perpendicular to the flow directions of flow passage 104, the south pole of magnet 108 induces a first polarity in the first contact of the reed switch, and the north pole of magnet 108 induces a second polarity, opposite the first polarity, in the second contact. The opposite magnetic polarities in the contacts cause the contacts to attract each other, thereby closing the switch. Accordingly, there is an alignment between the reed switch and the magnet along the flow direction of flow passage 104 at which the magnet causes the greatest closing force in the reed switch, the point hereinafter referred to as the reed switch's "center point of sensitivity." A displacement of the magnet from this alignment causes a lesser closing force, and at a threshold displacement from the center point of sensitivity, the induced magnetic force is unable to overcome the bias of the contacts to separate, and the switch opens, thereby changing state from closed to open, as represented by a corresponding change in the reed switch's output signal. As indicated below, body 106 is disposed in the flow passage, and springs used to locate the body in the flow passage in a steady state, or no-flow, condition are configured, so that magnet 108 is aligned with the reed switch's center point of sensitivity when the body is at steady state.

Annulus 150 and the reed switch are aligned together with respect to overall direction of flow through flow passage 104 (which may also be considered the axial direction, or direction of elongation, of flow passage 104 or inner surface 105) so that the annulus is centered with the reed switch's center point of sensitivity at the piston's steady state. Thus, the reed switch's center of sensitivity is equidistant from each of side edges 156. An inner radial surface 152 of annulus 150 has a diameter that is slightly greater than the diameter of outer radial surface 135 so that fluid may pass through a restricted flow gap 154. As is apparent from FIG. 2, the cross-sectional area of flow gap 154 (perpendicular to the axis of flow passage 104 as defined by inner surface 105) is much smaller than the cross-sectional area of the main portion of flow passage 104, as defined by inner surface 105 when unobstructed by annulus 150 or the piston. Thus, flow gap 154 is referred to herein as being restricted, in that flow through passage 104 is restricted at gap 154, relative to the main portion of passage 104. Restricted flow gap 154 may be characterized generally by its cross sectional area perpendicular to the direction of fluid flow through the gap. At the piston's steady state, this is the area perpendicular to the direction of elongation of flow switch 100. For a given fluid and differential pressure across the flow gap, a smaller cross sectional area allows a lower volumetric flow rate than does a larger cross sectional area.

A pair of helical compression springs 160 wrap around an exterior of outer radial surface 135. Compression springs 160 encircle piston 106 but have an inside diameter larger than the diameter of radial surface 135. A first side of each spring 160 biases against a respective one of side surfaces 156 of annulus 150, and a second side of each spring 160 biases against a respective interior face 155 of one of flanges 140 opposing each corresponding side surface 156. In this way, the springs bias against each other to thereby bias piston 106 to a centered position in flow switch 100, and at which magnet 108 aligns (in the axial direction) with annulus 150 (and, thus, with the reed switch's center of sensitivity). Accordingly, in this position, magnet 108 causes the reed switch to close.

Figure 3:
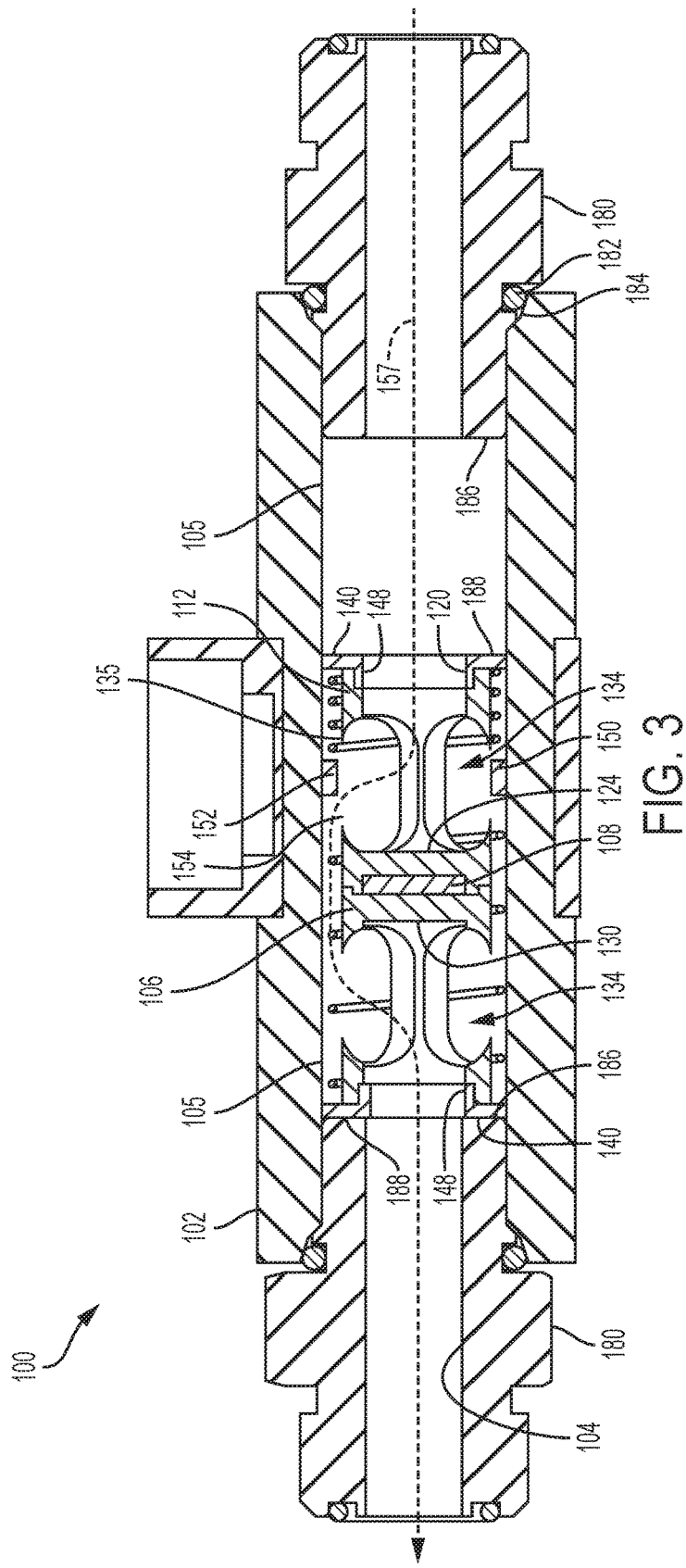
FIG. 3 is a cross-sectional view of the bidirectional flow switch of FIG. 1 illustrating a response to a fluid flow.

FIG. 3 illustrates the embodiment described with respect to FIG. 2, in operation. As fluid velocity begins to rise under media flow through the sensor, a pressure differential develops across the device. The piston responds to the differential by translating against the downstream compression spring in the direction of flow. As piston displacement progresses, the axial slots on the upstream side of the piston begin to pass through the stepped down metering bore diameter in the flow body at 150. Once the slots are exposed on the downstream side of the stepped down diameter in the flow body, the differential pressure builds at a lower slope relative to flow. Pressure drop across the unit is thus minimized as flow increases across the switch. The functional response of the piston is the same in keeping with direction of fluid flow. At full flow, the piston is limited in displacement by the end flanges which will come to rest against upstream and downstream stops in the flow body. Their location is designed to take advantage of best pressure drop relationship of components. The piston stops may be provided as part of end fitting componentry or retaining hardware.

More specifically, in the event that a fluid begins to flow through flow switch 100, for example when a valve supplying fluid to flow switch 100 is opened, a pressure differential across the valve is introduced, causing a net force on the piston in the direction of the flow and causing fluid flow through restricted flow gap 154. Because restricted flow gap 154 has a relatively small cross-sectional area (in comparison to flow path 157 upstream of the piston), flow gap 154 cannot relieve large flow rates, and, in such circumstances, differential pressure builds, causing piston 106 to move in the direction of the differential pressure (i.e. from high pressure to low pressure). That is, a force on the piston from the differential pressure (i.e. fluid force) that is greater than the net spring force of the opposing springs displaces the piston in the direction of the fluid flow. At a predetermined displacement, the magnetic field from magnet 108 is insufficient to close the reed switch at the new distance between those devices, and the reed switch opens. This predetermined displacement corresponds to a flow threshold (and corresponding pressure). It should be understood that, for a given fluid having a density and a viscosity, a given a differential pressure across the switch results in, and therefore corresponds with, a steady state flow rate. Therefore, "threshold pressure" and "threshold flow" are interchanged throughout this disclosure.

As pressure increases, the piston moves beyond the predetermined displacement so that slots 134, which at the body's steady state are disposed (in the axial direction) on a first side of annulus 150, now oppose the annulus in the sensor's radial direction and so that slot 134 extends beyond annulus 150 on both a second side opposite the first side of annulus 150 and on the first side. This increases gap 154, i.e. the distance between the closest surfaces of inner surface 105 and an outer surface of piston 106 along fluid flow path 157, in this instance being between annulus 150 and a corner of slots 134, and in so doing reduces resistance to flow through path 157.

Flow path 157, in the flow direction shown in FIG. 3, flows through through-bore 148 of a first flange 140, through first blind bore 120, through slots 134 in first portion 112, through gap 154 between outer radial surface 135 and inner surface 105/annulus 150, through slots 134 in second portion 116, through second blind bore 128, through through-bore 148 in a second flange 140, and out into flow passage 104. When fluid flow through flow switch 100 moves in the direction opposite that indicated at 157, the flow drives piston 106 in the direction opposite to that reflected in FIG. 3. Referring again to FIG. 2, such reverse flow enters piston 106 at the bore 148 in the left side flange 140 and into blind bore 126. Flow exits out from the left slot 134 in outer piston surface 135 and through gap 154 between the inner surface of annulus 150/inner surface 105 and outer surface 135 of piston 106. Again, the cross sectional area of gap 154 (transverse to the flow direction) is restricted as compared to the cross section of flow passage 104 outside of piston 106, or indeed with respect to the cross sectional area of flow path 157 within the piston, so that gap 154 presents a resistance to flow that causes the flow to exert a force to the right against leftward-facing surfaces of piston 106. This tends to move piston 106 to the right, compressing the left-side spring 160 between surfaces 155 and 156. As piston 106 moves to the right, the portion of surface 135 at center section 132 of piston 106 opposite annulus 150 moves to the right, so that eventually the outer opening of the left-side slot 134 reaches a point opposite annulus 150 (in the radial direction with respect to the axis of flow passage 104). This widens gap 154, thereby reducing the resistance to flow, which corresponds to reducing the rightward force that the fluid flow applies to the piston against the spring bias. The piston's movement settles at a piston position that equalizes the spring bias and the flow resistance/pressure. Slots 134 are disposed in piston 106 so that gap 154 does not widen until the piston is displaced (from zero flow conditions) at least a distance at which magnet 108 is sufficiently far from the reed switch that the reed switch opens.

As reflected above, change in outer surface 135 between the surface at center section 132 and the slots 134 means that movement of piston 106 in either the left or the right direction controls the width of gap 154, which in turn defines the resistance to fluid flow through passage 104 and device 100. In steady state conditions, i.e. when there is no flow through the flow passage and device 100 and springs 160 therefore center piston 106 so that center section 132 and magnet 18 are opposite the reed switch in the radial direction (with respect to the center axis of passage 104), the area of gap 154 is relatively small, increasing the resulting flow resistance and, thereby, the sensitivity of piston 106 (in terms of its tendency to move within flow passage 104) to fluid flow. Because piston 106 carries magnet 108, and because movement of magnet 108 results in a change of state in the reed switch, the sensitivity of piston 106 to fluid flow when gap 154 is relatively small translates to sensitivity in the ability of flow sensor 100 to detect fluid flow. As indicated above, that sensitivity to fluid flow corresponds to movement of piston 106. Once piston 106 has moved sufficiently so that the relative position between magnet 108 and the reed switch changes the reed switch's state (i.e. so that the reed switch conveys a signal change-of-state to an output device), there is no further need for switch 100 to be highly sensitive to increased fluid flow. Accordingly, the width of center section 132 opposite annulus 150 and the reed switch is such that either the left or right slot 134 reaches a position opposite annulus 150 when, or shortly after, magnet 108 moves sufficiently far in the axial direction to change the reed switch's state. This increases the area of gap 154, thereby reducing resistance to fluid flow through path 157 (FIG. 3) and allowing further increases in fluid flow rate through path 157 without requiring further movement (or significant movement) in piston 106. As a result, switch 100 demonstrates sensitivity in detecting relatively small changes in fluid flow from steady state (i.e. zero flow) conditions but, having detected such changes, thereafter accommodates a large range of subsequent increases in flow. That is, flow path 157 provides a relatively unrestricted flow path to minimize a pressure loss across flow switch 100 at flow rates above the threshold required to trip the flow switch (i.e. the reed switch opens). In this way, the flow switch is designed to detect relatively low flow rates, yet allow relatively high flow across the flow switch with a minimal differential pressure (i.e. backpressure).

Referring again to FIG. 3, fluid couplings 180 attach at each end of main body 102 via a threaded coupling and sealed with O-rings 182. The ends of housing 102 may be considered respective fluid ports of the sensor, at which fluid may enter and/or exit the sensor depending on the flow direction. Couplings 180 may facilitate insertion of the sensor into a fluid system for which it is desired to detect bidirectional flow. Tapered edges 184 compress O-rings 182 as fluid couplings 180 are tightened into female threads in the ends of main body 102. Fluid couplings 180 provide attachment means so that flow switch 100 can be coupled with, for example, a hydraulic or pneumatic line. In the illustrated embodiment, fluid couplings have male threads on the outer diameter that couple with female threads on an inner diameter of a corresponding coupling, and an O-ring provides a seal between the two components when they attach. Further, fluid couplings 180 provide stop faces 186 that limit movement of piston 106 in either direction in flow passage 104. When fluid flow reaches a maximum threshold flow in either direction, end faces 188 of piston 106 abut faces 186, limiting the piston's movement. By limiting the piston's axial movement, both springs 160 are always under compression (that is, corresponding interior faces 155 and side faces 156 are never, in this embodiment, spaced apart a distance that is greater than the spring's uncompressed length), and neither spring is compressed to a point at which the spring buckles. In further embodiments, retaining rings are inserted into the flow switch and act as stops in lieu of stop faces 186 of fluid couplings 180. Stop faces 186 are spaced from the center of flow switch 100 at least so that piston 106 may travel enough that a total cross sectional area (hereinafter, "flow area"), comprising a sum of the area of the portions of each of the slots, perpendicular to the corresponding slot's radial direction of extension, that are shifted past annulus 150 (i.e. the slots and portions thereof that are normally on the opposite side of stepped down portion under zero flow conditions), is greater than the annular cross sectional area (in the direction perpendicular to main body 102's direction of elongation) between inner surface 105 and outer radial surface 135. Therefore, when flow is flowing at the maximum threshold so that a side face 188 abuts a stop face 186, the greatest choke point (that is, the smallest area through which flow passes) is flow through the annulus between inner surface 105 and outer radial surface 135, and further piston travel, while increasing the flow area, provides only a marginal reduction in pressure drop across the switch.

Once the piston moves a certain predetermined distance from its resting, steady state (zero flow) position, the magnet moves out of the range of the reed switch so that the normally open reed switch, having been closed by the electromagnetic magnetic force of the magnet when the reed switch and magnet were in proximity, opens. Upon changing states from closed to open, the reed switch indicates that the magnet has moved a certain distance from the reed switch and, therefore, a threshold flow is passing through the sensor. When the flow drops below the threshold flow, the piston returns toward its position under zero flow in response to the bias of springs 160, and the reed switch changes states from open to closed. The reed switch state changes translate into changes in an output signal on electrical leads from the reed switch, as should be understood. The leads communicate the output signal to a processor, a visual indicator, or other device as desired in an operating system. In this way, flow switch 100 indicates whether or not a threshold flow is passing through the flow switch.

The strength of magnet 108, spring constants of springs 160, the clearance between outer surface 135 and inner surface 152 (i.e. flow gap 154), and the slot geometry and placement may all be varied to adjust the sensitivity and operating parameters of the flow switch as well as to adapt the flow switch for various fluids having different densities, viscosities, etc. It should be understood, however, that certain parameters may be quickly resolved so that bidirectional flow switch 100 has a flow rate set point determined largely as a function of the spring's spring constants and the clearance of restricted flow gap 154. For example, magnet 108's strength and the reed switch's sensitivity may be paired so that a given displacement of the piston causes the switch to change state, wherein the given displacement is less than the maximum travel of the entire piston so that the flow switch accommodates a range of flow rates that encompass both the threshold flow rate at which the sensor changes state towards the lower end of the flow rate range and a comparatively larger range of flow rates above the threshold flow rate so that the switch accommodates a broad range of operative flow and the piston displacement at which the leading edges of slots 134 align (in the radial direction with respect to the flow passage axis) with annulus 150, i.e. the displacement at which the cross-sectional area of flow gap 154 increases to facilitate flow through flow path 157. Once the above geometry is resolved, trial and error testing may be used to select a desired combination of springs and flow gap 154 dimensions. Prototypes may be manufactured with potential springs being paired with annuli of varying inner diameters, wherein the annuli are rings of varying inner diameters held in place via epoxy adhesive. If a prototype switch changes state at an undesirably high flow rate, the springs may be substituted for a pair of springs with lower spring rates, or the annulus may be replaced with an annulus of a smaller inner diameter, thereby providing a smaller clearance between the piston and the annulus. If the switch changes state at an undesirably low flow rate, springs with a greater spring constant may be used, or a larger clearance may be selected at gap 154 to increase the flow at which the switch changes state.

Because the piston has a mass, orienting the axis of elongation with respect to a vertical direction may displace the piston from a centered position within the flow switch in zero flow conditions (at which the magnet is aligned with the reed switch along in the axial direction of the flow switch). In some cases, such displacement may be negligible, while in other cases it may not. Therefore, to accommodate various orientations, different springs may be used. For example, a spring with a larger spring constant may be used below the piston, and a spring with a smaller spring constant may be used above the piston, when the flow switch is oriented so that the flow passage axis is vertical, so that the sum of the opposing spring forces and the force due to gravity causes the piston to be centered within the flow switch at zero flow. Alternatively, flanges 140 may be replaced with flanges that, when attached to piston 106, have different spacing from each of the flanges' opposing faces 155 to the magnet. For example, when the flow switch is oriented so that the flow passage axis is vertical, the lower flange may be spaced closer to the magnet than is the upper flange, thereby resulting in the lower spring providing a larger force at zero flow conditions. In this way, the offset flanges may center the magnet within the flow switch at zero flow.

In some situations, varying tolerances in the springs may cause the piston not to be centered within the flow switch (i.e. aligned so that the center of magnet 108 is aligned with the reed switch's center of sensitivity). In an embodiment in which flanges 140 attach to piston 106 via threads, one flange may be unscrewed from its corresponding female threads, thereby displacing its face 155 from the center of the piston, thereby relieving compression on the corresponding spring and shifting the center of piston 106 within flow body 102. In this way, the flow switch may be calibrated to compensate for inconsistent springs.

The flow switch may be in communication with, for example, a controller or a process control loop. In one embodiment, a controller in electrical communication with the flow switch provides a voltage across the reed switch and measures current through the reed switch. When the controller detects a current, indicating that the reed switch is closed and that a fluid flow rate is greater than the threshold flow rate, the controller sends a signal to a system that uses fluid flow rate information for a purpose defined by the system.

In an embodiment, for example, bidirectional flow switch 100 comprises more than one reed switch and/or more than one magnet. In the first position of the piston in the passage, the one or more magnetic sensors are, collectively, in a first state. That first state may be that all sensors are closed, or all open, or that one or more is closed and one or more is open. When the one or more magnets move in response to fluid flow in one direction or the other, the one or more magnetic sensors change state. In some embodiments, one or more of the sensors, but not necessarily all of the sensors, individually changes state, but the collective state of the one or more sensors has nonetheless changed. As discussed below, that state change at least provides an indication that a threshold flow rate has occurred, but it could also provide other information, e.g. the direction of that flow.

In a further example, flow switch 100 has a second and a third reed switch, one disposed on each side of annulus 150 so that the flow switch may indicate the direction of the flow. More specifically, flow switch 100 comprises a second normally open reed switch, spaced from the reed switch that is centered on the magnet in the steady state condition (i.e. the "center reed switch") in a first direction parallel to the bidirectional flow direction, and a third normally open reed switch spaced from the center reed in a second direction that is opposite the first direction. In this configuration, the flow switch may indicate the direction of flow. When the piston moves from its centered, resting position, magnet 108 may move from a generally-centered location as discussed above, where the center reed switch is closed and the second and the third reed switches are open, to a location at which the center reed switch opens with movement of piston 106 in response to fluid flow in the switch, as discussed above, but where one of the first and the second reed switches closes, depending on the direction of flow and corresponding piston movement direction. The displacement of the piston corresponds with the direction of the flow. A closing of the second flow switch indicates that the fluid is traveling in the first direction; a closing of the third flow switch indicates that the fluid is traveling in the second direction.

In some embodiments, the reed switches are spaced so that magnet 108 causes a directional reed switch (i.e. the second or the third reed switch) to close before the center reed switch opens. That is, at certain flow rates, both the center reed switch and a directional reed switch may be closed. In this configuration, in addition to indicating the direction of flow, the flow switch may provide a greater flow detection resolution than other embodiments having one reed switch or having different reed switch spacing. For example, if both a directional reed switch and the center reed switch are closed, the flow rate is nonzero, but below the threshold flow necessary to open the center reed switch, thereby providing a graduated resolution for the flow switch that is finer than the resolution of a bidirectional flow switch having only one reed switch. In other words, in a first state, only the center reed switch is closed; in a second state, both the center reed switch and the second reed switch are closed; and in a third state, the center reed switch is open, but the second reed switch is closed. The third state has a higher flow rate than the second state, which has a higher flow rate than the first state. Without the second flow switch, the first and second states would be indistinguishable.

Figure 7:
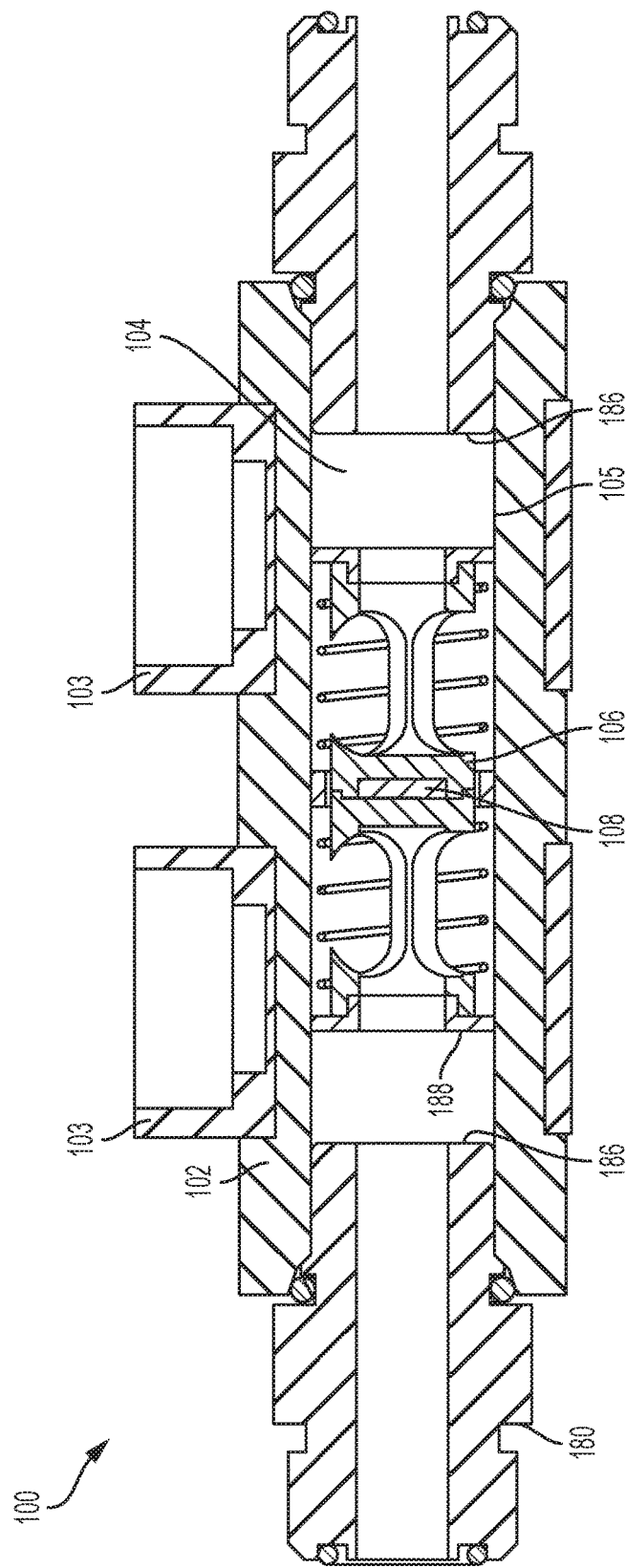
FIG. 7 is a partial cross-sectional view of a bidirectional flow switch according to an example embodiment.

In a yet further embodiment, and referring to FIG. 7, flow switch 100 has two reed switches (not shown) within sub-housings 103 attached to the housing at positions that are on opposite sides of annulus 150 and on opposite sides of magnet 108 (with respect to the direction of flow of fluid in passage 104) when piston 106 is in the steady state position. Through selection of sensors (e.g. the reed switches), the magnet, and testing, as discussed above, the sensors are spaced (with respect to the flow direction through passage 104) from the magnet (in the piston's steady state position) so that both reed switches are closed when the piston is in the steady state position, thereby providing notice to a downstream control system that the switch is in an operable condition during non-flow states. The sensors are, however, disposed sufficiently far apart that when flow occurs in the switch housing through passage 104 in one of the opposed flow directions, so that piston 106 moves in that direction as discussed above, and the magnet therefore moves toward one of the reed switches and away from the other, the one reed switch remains closed as the magnet moves toward it, while the increased distance between the magnet and the other reed switch reduces the magnetic field at the other reed switch such that the reed switch opens. Accordingly, and assuming the two reed switches are A and B, the switches have three states: (i) A and B closed; (ii) A open and B closed; and (iii) A closed and B open. State (i) corresponds to a no flow condition or a condition in which there is flow in either direction, but such flow is below the predetermined flow rate needed to change the sensors' state. State (ii) corresponds to flow in fluid passage 104 in the direction from A toward B at or above the predetermined flow rate, and state (iii) corresponds to flow in fluid passage 104 in the direction from B to A at or above the predetermined flow rate. In a variant of this embodiment, the two reed switches are spaced from the magnet (in the piston's steady state position) so that both reed switches are open when the piston is in the steady state position but are spaced sufficiently close that when flow occurs in the switch housing through passage 104 in one of the opposed flow directions at or above the predetermined flow rate, such that piston 106 moves in that direction, and the magnet therefore moves toward one of the reed switches and away from the other, the one reed switch closes as the magnet moves toward it, while the other reed switch remains closed while the magnet moves away from it. Again assuming switches A and B, piston 106 is in its steady state position (or is subject to a flow rate below the predetermined level) when A and B are open, is moving in the direction from sensor B toward sensor A when A is closed and B is open, and is moving in the direction from sensor A toward sensor B when A is open and B is closed. In either arrangement, the sensitivity of the device can be predetermined through testing and calibration, so that the state change in the two reed switches (from the steady state condition) occurs upon travel of the piston a predetermined distance in one direction or the other, corresponding to a predetermined flow rate in that direction. As in the earlier embodiments, the structure of piston 106, and particularly the placement of slots 134, is configured with respect to annulus 150 so that gap 154 widens at or after the flow rate reaches the predetermined level, so that the switch maintains its high sensitivity to directional flow detection over the desired flow rate range but thereafter accommodates a relatively broad range of flow rates within significant further piston movement.

Many modifications and other embodiments of the bidirectional flow sensor set forth herein will come to mind to one skilled in the art to which these inventions pertain having the benefit of the teachings presented in the foregoing descriptions and the associated drawings. For example, while this disclosure refers to a reed switch for detecting proximity of the magnet, in further embodiments, other magnetic sensors may be used, such as, for example, a Hall effect sensor. Because Hall effect sensors have voltage outputs proportional to magnetic field (for example, as the magnet moves further from the Hall effect sensor, the output voltage decreases), for the purposes of this disclosure, an output voltage from the Hall effect sensor below and above a threshold voltage may be respectively substituted for the open and closed states of the reed switch. Moreover, the continuous voltage output of the Hall effect sensor may be further utilized. The flow switch may be calibrated to output a signal indicating a precise flow rate for a given output voltage, rather than discreet flow ranges.

In a further embodiment, the piston is replaced with a pivotable magnetic housing. The magnetic housing pivots about an axis that is perpendicular to and passes through the axis of the flow passage's through-bore and is spring-biased towards a first orientation, e.g. in which the magnetic housing closes the flow passage. In an embodiment, the magnetic housing is similar to the rotating disk of a butterfly valve, wherein the rotating disk is spring-biased in a closed configuration in the first orientation, for example by a single spring disposed between housing 102 and the disk. The magnetic housing has geometry that causes the magnetic housing to pivot about its axis from its first orientation in the response to flow through the flow passage. For example, a cross section of the magnetic housing perpendicular to the flow body's elongation direction in its first orientation is unbalanced so that a larger cross sectional area is on a first side of the magnetic housing's pivot axis than a second side of the magnetic housing's pivot axis. In an embodiment with a rotating disk magnetic housing, a through hole perpendicular to the disk's face is disposed on one side of the axis to create an imbalance of fluid pressure between each side of the axis. As another example of geometry to cause the magnetic housing to pivot about its axis, the magnetic housing may have a concave curvature on one side of the axis and a convex curvature on the opposite side of the axis.

Such geometry, as exemplified by a typical hemispherical cup anemometer, causes the magnetic housing to pivot about the axis when fluid flows through the flow passage. The magnet is disposed in the magnetic housing away from the axis so that a rotation of the magnetic housing causes the magnet to pivot about the axis. Therefore, a pivoting of the magnetic housing causes the magnet's movement to be at least partially in the flow body's elongation direction. A threshold flow rate through the flow passage causes the magnet to displace a distance from the reed switch so that the reed switch opens. In an embodiment, as the magnetic housing pivots, a cylindrical through-bore in the magnetic housing, which is oriented so that its axis is vertical under zero flow conditions, pivots so that the through-bore provides a flow passage at least partially in the direction of flow, thereby providing a bypass across the magnetic housing that decreases back pressure as flow through the bidirectional flow sensor increases. In a further embodiment in which the magnetic housing is a rotating disk, a pivoting of the disk opens a fluid passageway, thereby allowing fluid to bypass the magnetic housing and reducing back pressure.

In still further embodiments, switch 100 comprises a housing, such as housing 102 in FIGS. 1-7, optionally with couplings at the end ports, with a piston similar to piston 106, but without an internal magnet. Two LEDs are disposed in the housing, each disposed so that, when the piston is at its steady state position, the LED is aligned radially (with respect to the direction of fluid flow through passage 104) at or inward from the edge of a respective flange 140. Housing 102 includes an insert at each LED that is transparent to light that is output from the LED, and each LED is disposed so that light from the LED passes through the optically transparent insert into passage 104. When piston 106 is at steady state, the piston blocks transmission of the LED's light across flow passage 104 to an opposing side of inner surface 105. If, however, piston 106 moves in either direction in flow passage 104 in response to fluid flow (as described above) a distance sufficient so that the outer surface of piston 106 is no longer radially opposite the LED and the optically transparent insert, light from the LED passes to the opposing side of inner surface 105. Accordingly, housing 102 includes similar optically transparent inserts in housing 102 respectively opposite flow passage 104 from each LED and its adjacent optically transparent insert. Attached to housing 102 at the opposite side of each of the receiving optically transparent inserts is a respective optical sensor capable of detecting light output from the corresponding LED. Each optical sensor outputs a signal that is transmitted, for example by a wired connection, to a processor. The distance (with respect to the flow directions through passage 104) inward of the piston edges at which the LEDs are disposed determines the distance the piston must travel in order to remove the piston's interference with the transmission of light from one of the LEDs to its opposing optical sensor. As described above, the piston's travel results from fluid flow in the passage, and this inward offset of the LEDs therefore corresponds to a predetermined flow rate necessary for one of the optical sensors to change state from detection of no light to detection of light from its LED. Thus, by monitoring the two optical sensors, the processor determines when flow above the predetermined set point occurs and, by determining which of the two optical sensors changes state, determines the direction of flow. Housing 102 includes annulus 150, and the piston includes slots 134 as in the embodiments discussed above with respect to FIGS. 1-7. These features are configured with respect to each other so that gap 154 is small when the piston is in its steady state position but widens when or after the piston travels the predetermined distance to remove the piston's interference with the travel of light from one of the LEDs to its optical sensor, to thereby permit increased flow rate and avoid excessive pressure drop across the device. It will be understood that such embodiments may be useful when the switch will be used with optically transmissive fluids.

Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A bidirectional flow switch, comprising:
   a housing that defines a first port, a second port, and a flow passage between the first port and the second port so that the flow passage defines a first flow direction from the first port to the second port and a second flow direction from the second port to the first port;
   two magnetic sensors, each proximate the housing in a respective position fixed with respect to the first flow direction and the second flow direction;
   a body disposed movably within the flow passage;
   an elastic member disposed between the housing and the body so that the elastic member biases the body to a first position when no fluid flows through the flow passage;
   a magnet attached to the body so that the magnet is movable with the body in the flow passage in the first flow direction and in the second flow direction, in response to flow of fluid in the flow passage in the first flow direction and flow of fluid in the flow passage in the second flow direction, respectively,
   wherein the magnet is disposed with respect to the body, and wherein the body and the two magnetic sensors are disposed with respect to the flow passage, so that
      at the first position of the body, the magnet and the two magnetic sensors are disposed with respect to each other so that the two magnetic sensors are in a first state,
      upon a predetermined rate of flow of fluid in the first flow direction, the body moves within the flow passage from the first position so that the magnet moves in the first flow direction, causing relative movement between the magnet and the magnetic sensors that causes the two magnetic sensors to change state from the first state, and
      upon a predetermined rate of flow of fluid in the second flow direction, the body moves within the flow passage from the first position so that the magnet moves in the second flow direction, causing relative movement between the magnet and the two magnetic sensors that causes the two magnetic sensors to change state from the first state.

2. The bidirectional flow switch as in claim 1, wherein the body comprises a housing and wherein the magnet is attached to the housing of the body.

3. The bidirectional flow switch as in claim 1, wherein the magnet is a single magnet, and, when the body is at the first position, the single magnet is aligned between the two magnetic sensors with respect to flow of fluid through the flow passage.

4. The bidirectional flow switch as in claim 3, comprising a third magnetic sensor proximate the housing, wherein the single magnet is aligned with the third magnetic sensor with respect to flow of fluid through the flow passage when the body is in the first position.

5. The bidirectional flow switch as in claim 3, wherein
   upon a predetermined rate of flow of fluid in the first flow direction, the body moves within the flow passage from the first position so that the single magnet moves in the first flow direction, causing relative movement between the single magnet and the two magnetic sensors that causes the two magnetic sensors to change state from the first state to a second state, and
   upon a predetermined rate of flow of fluid in the second flow direction, the body moves within the flow passage from the first position so that the single magnet moves in the second flow direction, causing relative movement between the single magnet and the two magnetic sensors that causes the two magnetic sensors to change state from the first state to the second state.

6. The bidirectional flow switch as in claim 5, wherein
   an outer surface of the body and an inner surface of the housing that defines the flow passage define a minimum cross sectional area therebetween transverse to direction of flow of fluid both in the first flow direction and the second flow direction,
   the body and the housing are configured with respect to each other so that when the body is at the first position, an entirety of flow of fluid through the flow passage passes through the minimum cross sectional area,
   the outer surface of the body and the inner surface of the housing are configured with respect to each other so that, at a relative position between the body and the housing resulting from a rate of flow of fluid in the first flow direction at or greater than the predetermined rate of flow of fluid in the first flow direction, the minimum cross sectional area is greater than the minimum cross sectional area when the body is in the first position, and
   the outer surface of the body and the inner surface of the housing are configured with respect to each other so that, at a relative position between the body and the housing resulting from a rate of flow of fluid in the second flow direction at or greater than the predetermined rate of flow of fluid in the second flow direction, the minimum cross sectional area is greater than the minimum cross sectional area when the body is in the first position.

7. A bidirectional flow switch comprising:
   a housing defining a flow passage that is elongated in a first direction;
   two magnetic sensors, each in a respective fixed position with respect to the flow passage;

a body disposed in the flow passage and that is movable with respect to the housing;

a magnet in a fixed position with respect to the body so that a movement of the body causes a movement of the magnet, wherein the movement of the magnet has a directional component in the first direction; and an elastic member that biases the body towards a first position within the flow passage, wherein the body and the housing are configured so that a first threshold flow rate through the body in the first direction causes the magnet to move past a first displacement distance in the first direction, and a second threshold flow rate through the body in a second direction that is opposite the first direction causes the magnet to move past a second displacement distance in the second direction, and wherein the two magnetic sensors are in a first state when the body is in the first position, and the two magnetic sensors are in a second state that is different from the first state when the body is displaced past at least one of the first displacement distance in the first direction and the second displacement distance in the second direction.

8. The bidirectional flow switch of claim 7, wherein the body comprises a plug portion that directs at least a majority of flow between an exterior surface of the plug portion and an inner surface of the flow passage, wherein the flow passage comprises a stepped-down portion that defines a portion of the flow passage with a cross sectional area transverse to the first direction that is less than a cross section of the flow passage on a first side of the stepped-down portion in the first direction and a cross section of the flow passage on a second side of the stepped-down portion in the second direction, wherein the stepped-down portion is aligned with respect to the plug portion when the body is in the first position so that the plug portion is within the stepped-down portion, and wherein a displacement of the plug portion past the stepped-down portion causes a greater flow area than when the plug portion is aligned with the stepped-down portion.

9. The bidirectional flow switch of claim 7, wherein the stepped-down portion is centered with respect to the respective fixed positions of the two magnetic sensors.

10. The bidirectional flow switch of claim 7, wherein a center of sensitivity of each magnetic sensor of the two magnetic sensors aligns with a plane that is perpendicular to the first direction, and wherein the magnet is between the planes when the body is in the first position.

11. The bidirectional flow switch of claim 7, wherein each magnetic sensor of the two magnetic sensors is a reed switch.

12. The bidirectional flow switch of claim 7, wherein each magnetic sensor of the two magnetic sensors is a Hall Effect sensor and wherein each of the first state and the second state corresponds to a respective output signal of the magnetic sensor.

13. The bidirectional flow switch of claim 7, wherein the elastic member comprises a pair of opposing compression springs.

14. A bidirectional flow switch comprising:

a housing defining a generally cylindrical flow passage between a first port and a second port so that the flow passage defines a first flow direction from the first port to the second port and a second flow direction from the second port to the first port;

a body that is movable with respect to the housing in the first flow direction and in the second flow direction, wherein the body comprises a solid portion across its interior so that fluid received by a respective end of the body from the first port or the second port flows about the solid portion and between an outer surface of the solid portion and an inner surface of the flow passage;

a stepped-down section within the generally cylindrical flow passage having a diameter smaller than a diameter of the flow passage at a first side of the stepped-down section and smaller than a diameter of the flow passage at a second side of the stepped down section;

two magnetic sensors attached to the housing;

a magnet attached to the body; and a pair of springs that bias the body towards a first position in which the magnet is aligned with the two magnetic sensors and the stepped-down section in a direction transverse with the first flow direction;

wherein, when the body is in the first position, a distance is defined between the stepped-down section and an exterior of the body so that a first threshold flow rate through the housing in the first flow direction causes the magnet to move past a first displacement distance in the first flow direction, and so that a second threshold flow rate through the housing in the second flow direction causes the magnet to move past a second displacement distance in the second flow direction, and wherein the two magnetic sensors are in a first state when the body is in the first position, and the two magnetic sensors are in a second state that is different from the first state when the body is displaced past at least one of the first displacement distance in the first flow direction and the second displacement distance in the second flow direction.

15. The bidirectional flow switch of claim 14, wherein each magnetic sensor of the two magnetic sensors is a reed switch.

16. The bidirectional flow switch of claim 14, wherein each magnetic sensor of the two magnetic sensors is a Hall Effect sensor.

* * * * *